(12) United States Patent
Hua et al.

(10) Patent No.: US 11,258,908 B2
(45) Date of Patent: Feb. 22, 2022

(54) SPECTRAL BLENDING WITH INTERIOR MICROPHONE

(71) Applicant: Apple Inc., Cupertino, CA (US)

(72) Inventors: Thanh P. Hua, San Jose, CA (US); Esge B. Andersen, Campbell, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/935,594

(22) Filed: Jul. 22, 2020

(65) Prior Publication Data

US 2021/0092233 A1 Mar. 25, 2021

Related U.S. Application Data

(60) Provisional application No. 62/904,259, filed on Sep. 23, 2019.

(51) Int. Cl.
| | |
|---|---|
| *H04B 15/00* | (2006.01) |
| *H04M 9/08* | (2006.01) |
| *H04R 19/04* | (2006.01) |
| *H04R 1/10* | (2006.01) |
| *G10L 21/0208* | (2013.01) |

(52) U.S. Cl.
CPC ......... *H04M 9/082* (2013.01); *G10L 21/0208* (2013.01); *H04R 1/1091* (2013.01); *H04R 19/04* (2013.01); *G10L 2021/02082* (2013.01); *H04R 2460/01* (2013.01)

(58) Field of Classification Search
CPC ..... H04M 9/082; H04R 1/1091; H04R 19/04; G10L 21/0208
See application file for complete search history.

(56) References Cited

U.S. PATENT DOCUMENTS

| | | | |
|---|---|---|---|
| 2014/0093091 A1* | 4/2014 | Dusan | H04R 1/1083 381/74 |
| 2014/0126734 A1* | 5/2014 | Gauger, Jr. | G10K 11/17821 381/71.6 |
| 2014/0169579 A1* | 6/2014 | Azmi | G10K 11/17821 381/71.6 |
| 2020/0404416 A1* | 12/2020 | Sapozhnykov | H04R 1/222 |
| 2021/0076131 A1* | 3/2021 | Minich | H04R 1/1016 |

\* cited by examiner

*Primary Examiner* — Simon King
(74) *Attorney, Agent, or Firm* — Womble Bond Dickinson (US) LLP

(57) ABSTRACT

A headphone can include plurality of exterior microphones, that generates corresponding exterior microphone signals, an accelerometer that generates an accelerometer signal; and an interior microphone, not directly exposed to the environment, that generates an interior microphone signal. A processor of the headphone can be configured to generate an audio signal containing voice of a user, based on a) the accelerometer signal, b) the interior microphone signal, and c) the plurality of exterior microphone signals.

20 Claims, 4 Drawing Sheets

SPECTRAL BLENDING WITH INTERIOR MICROPHONE

CROSS-REFERENCE TO RELATED APPLICATION

This application claims the benefit of U.S. Provisional Patent Application No. 62/904,259 filed Sep. 23, 2019, which is incorporated by reference herein in its entirety.

FIELD

One aspect of the disclosure relates to blending an audio signal using an interior microphone of a headphone for voice communication. Other aspects are also described.

BACKGROUND

Audio systems, for example, headphones, can have speakers that are worn over-ear, on-ear, or in-ear. Headphones can be communicatively connected to other devices. Headphones can receive audio signals from other devices and use the audio signals to drive speakers of the headphones. Headphones conveniently enable users to listen to audio content privately, without broadcasting the audio content to others who may be nearby.

SUMMARY

Headphones can have exterior microphones to pick up user's speech and provide communication between users (e.g., telephony). Headphones with exterior microphones are sensitive to wind and background noise. For telephony, voice intelligibility is degraded because the exterior microphones can pick up wooshing noise created by wind.

An accelerometer is less sensitive to wind and can help pick up low frequencies of voice activity and speech. The accelerometer can be blended with exterior microphones to cover low frequencies, however, accelerometers are band limited to frequencies lower than 800 Hz and has a low signal to noise ratio. An additional microphone interior of the headphone that is shielded from background noise and wind can be used to extend the frequency bandwidth of the blended speech signal without adding noise. This can improve voice intelligibility under windy and noisy conditions. As used herein, an "interior microphone" can also be referred to as an internal or error microphone.

In one aspect of the present disclosure, an audio system, for example, a headphone, has a plurality of exterior microphones, an accelerometer, and an interior microphone that is not directly exposed to the environment. As used herein, an "exterior microphone" can also be referred to as an external microphone.

The microphones and accelerometer each generate a corresponding signal that senses voice activity of a user, which can include language as well as other sounds, for example, a grunt, a cough, or a sigh, that is vocalized by a user. A processor of the audio system is configured to generate an audio signal containing voice activity of the user, based on a) the accelerometer signal, b) the interior microphone signal, and c) the plurality of exterior microphone signals.

The interior microphone and the accelerometer are resistant to background noise and wind, but are bandlimited. The exterior microphones have a wide frequency range to sense vocal sounds of the user, but are sensitive to background noise and wind. The audio system can spectrally combine the exterior microphone signals with the interior microphone signal and accelerometer signal to form an audio signal that provides intelligible speech of a user during noisy and/or windy conditions. Other aspects are described.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Several aspects of the disclosure with reference to the appended drawings are now explained. Whenever the shapes, relative positions and other aspects of the parts described are not explicitly defined, the scope of the invention is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description.

Figure 1:
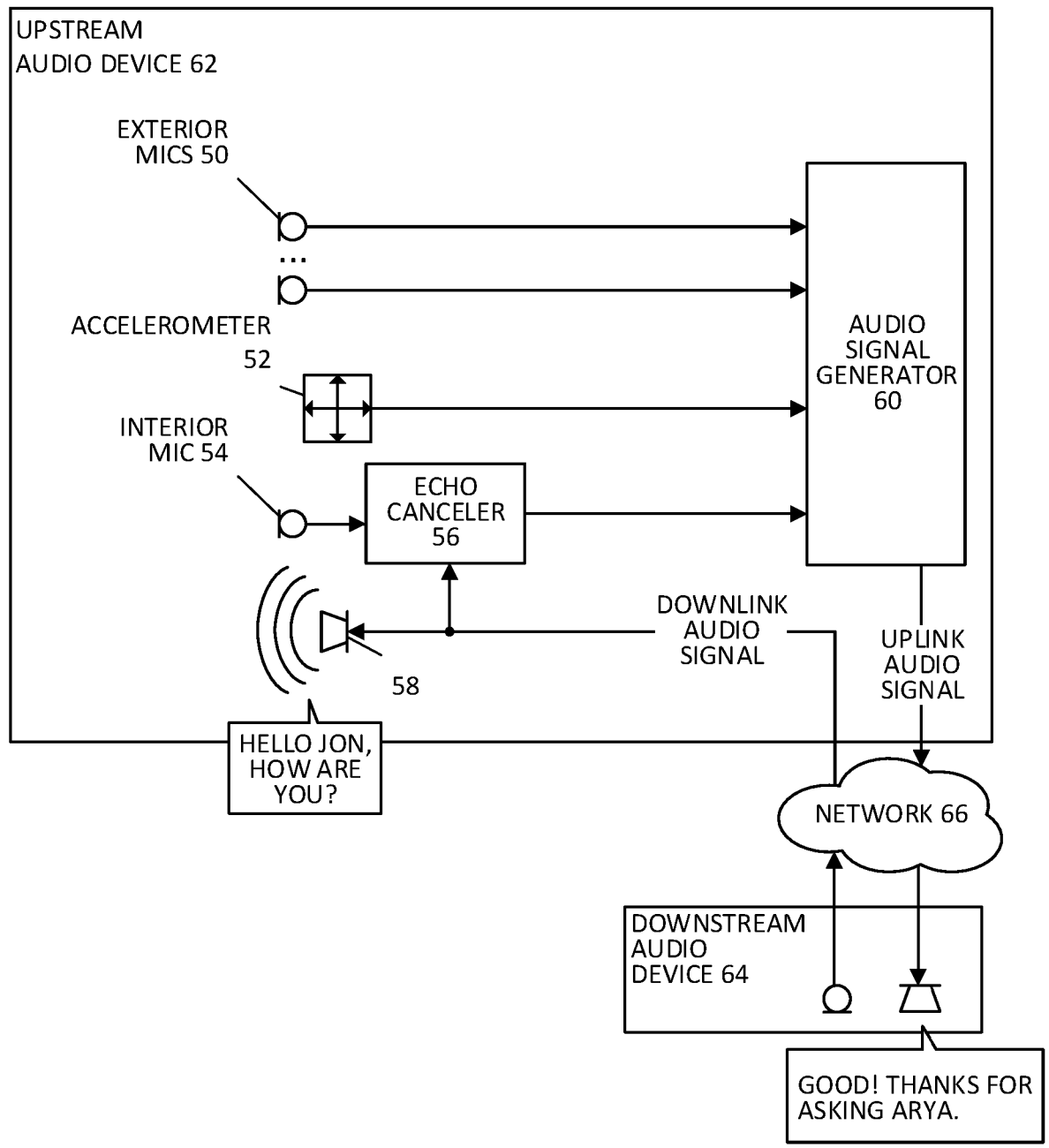
FIG. 1 shows a process and system for generating an audio system with an interior microphone, according to one aspect.

Referring to FIG. 1, an upstream audio device 62 is shown. The audio device can be an in-ear headphone (earphone or earbud) or may be on-ear or over-the-ear headphones (open-back, closed-back, or semi-open headphones). The audio device can communicate, over a network 66, with a downstream audio device 64. For example, audio device can communicate using known communication hardware and software protocols such as Ethernet, TCP/IP, Wi-Fi, 3G, 4G, 5G, Bluetooth, ZigBee, or other equivalent technologies. The audio device can include wired or wireless transmitters and receivers that can communicate (e.g., receive and transmit data) with other networked devices.

The devices can communicate audio signals back and forth to allow users to verbally communicate with each other in a communication session. The audio device has a speaker 58 that can be driven with a downlink signal received from a downstream audio device 64 through the network 66. Although one speaker is shown, the audio device can have more than one speaker, e.g., a left and right ear-worn speaker of a headphone. The downlink signal can contain voice activity of a user of the downstream device. Thus, users of the upstream and downstream device can communicate with each other through respective devices.

Figure 5:
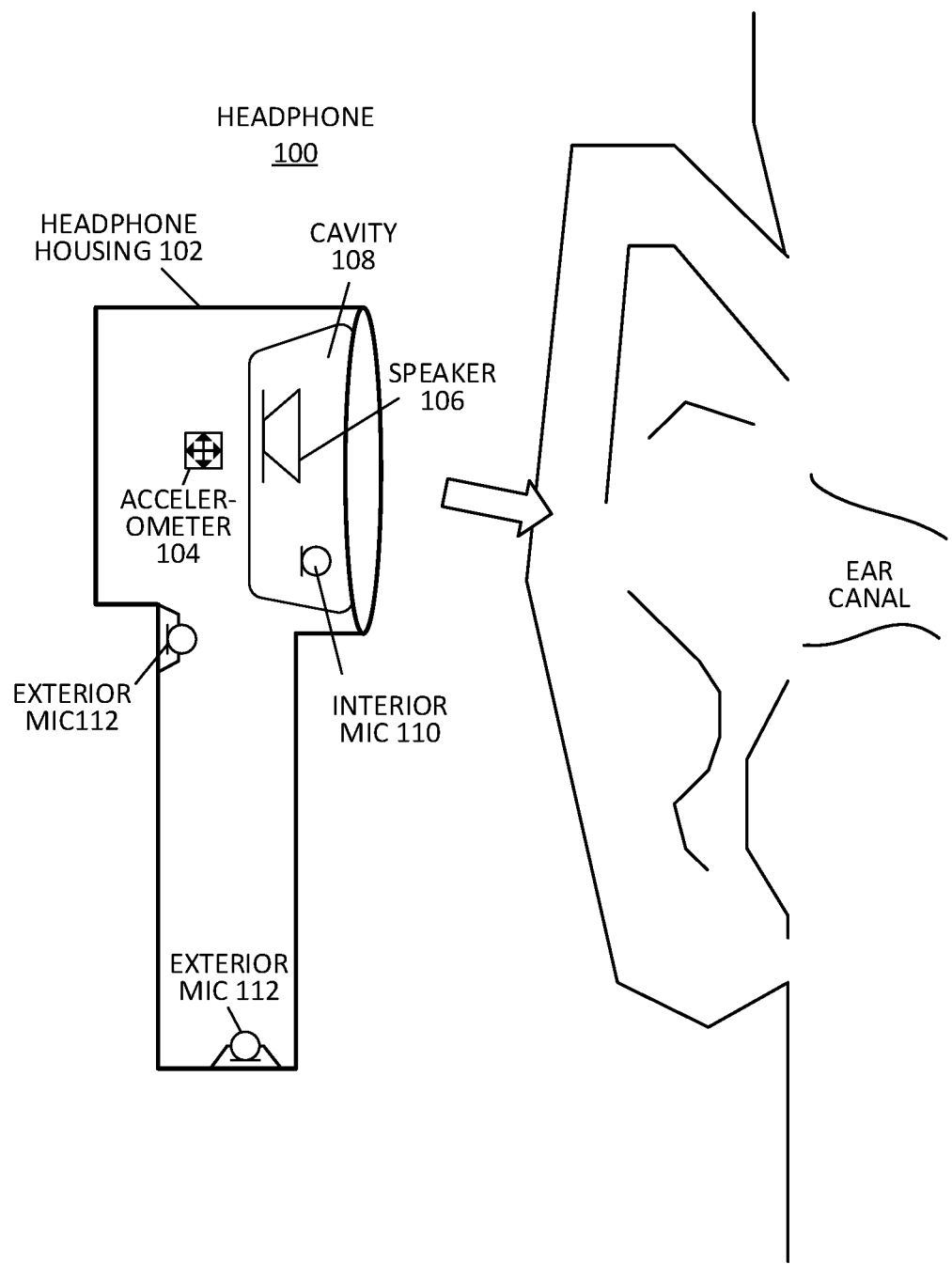
FIG. 5 illustrates an example of an in-ear headphone, according to one aspect.

A plurality of exterior microphones 50 are directly exposed to an environment of the audio system. Although not necessarily external to the audio device, the exterior microphones can directly sense sound in the environment of the audio device, e.g., ambient air. For example, referring to FIG. 5, exterior mics 112 can be housed within a headphone housing 102, but still exposed to ambient air, through a mesh, screen, one or more openings, a diaphragm, or other known means that allow sound pressure changes to reach the exterior microphones from ambient air. Further, although two exterior microphones are shown in FIGS. 5 and 6, the device can have additional microphones. Further, FIGS. 5 and 6 show one side of a headphone but it should be understood that the headphone can have a second side that also has the same features as the side shown.

Referring back to FIG. 1, the exterior microphones generate corresponding exterior microphone signals that are received by the audio signal generator 60. The exterior microphones can capture speech or other voice activity of a user. The exterior microphones provide a high quality pickup of the user's speech because they are exposed to the surrounding environment and are relatively close to a user's mouth when located on a headphone. The exterior microphone signals have high signal to noise ratio (SNR) and a wide frequency coverage. As discussed, because the exterior microphones are exposed to the surrounding environment, however, they can inadvertently pick up background noise and are vulnerable to noise caused by wind. Noise caused by wind can mask the user's voice, thus making it harder for a downstream user of the downstream audio device to understand the user. Thus, the audio device has additional audio sensing components (the interior microphone 54 and accelerometer 52) to improve sensing the user's speech during such conditions.

The audio device has an accelerometer 52 that generates an accelerometer signal. The accelerometer is less sensitive to background noise and wind than the exterior microphones. Thus, the accelerometer can provide additional audio sensing even during noisy and/or windy conditions. The accelerometer, however, is band limited. It can sense low frequency sound but is limited in sensing frequencies above 800 Hz. Further, the accelerometers have low signal to noise ratio.

In addition, the audio device has an interior microphone 54 that is not directly exposed to the environment, that generates an interior microphone signal. The interior microphone can be shield from the wind and ambient noise. For example, referring to FIG. 5, the interior microphone 110 can be located in a housing 102 that suppresses noise and wind pickup. Because the audio device is worn on the user's head, the user's speech can still be sensed by the interior microphone through the occlusion effect. Further, where the device is a headphone set, the interior microphone benefits from passive attenuation, the body of the headphone shields the microphone from noise, thereby attenuating the noise passively. The speaker 106 and the interior microphone can both be housed in the same cavity 108. The cavity can be adjacent to and facing the user's ear when worn. This allows the interior microphone to better sense the user's voice through the occlusion effect and bone conduction, however, double talk is a problem because the interior microphone will pick up sound emanated from the speaker.

Referring back to FIG. 1, in one aspect, the interior microphone 54 can have an echo canceler 56 that cancels echo. The echo canceler can apply linear echo cancelling and/or residual echo suppression upon the interior microphone signal to produce an echo suppressed interior microphone signal. The echo canceler can use the downlink audio signal used to drive the speaker as a reference for echo canceling. The echo canceler may employ signal processing operations such as an active echo cancellation (AEC) algorithm and/or a residual echo suppression (RES) algorithm upon an acoustic microphone signal. The AEC may reduce linear components of echo by estimating the echo from the downlink signal and subtracting the echo from the microphone signal (or the accelerometer signal) that is produced by the near-end device. RES can eliminate non-linear components of echo that could not be removed by the AEC by applying a RES filter that is determined based on echo statistics that are determined by the AEC.

An audio signal generator 60 generates an uplink audio signal, based on a) the accelerometer signal, b) the interior microphone signal, and c) the plurality of exterior microphone signals. The uplink audio signal can have signal information that, when used to drive a speaker, reproduces the user's voice activity, which can include speech. Thus, the uplink audio signal can be communicated to a downstream device 64 as part of a telephone communication (e.g., through network 66).

In one aspect, the exterior microphones form a microphone array. At least two of the exterior microphone signals are beamformed at block 72 to form an exterior pickup beam. The pickup beam can be adaptively formed to maximize and/or optimize the user's voice pickup. This can be done, for example, by forming the pickup beam having a maximum signal to noise ratio. Other adaptive beamforming techniques can be used. The pickup beam can be directed towards a location where the user's speech has an optimal strength, for example, based on signal to noise ratio. This location can be located near the user's mouth. The resulting beamformed audio signal can be used to generate the audio signal at block 80.

In one aspect, a wind detector 74 can detect if wind is present. The detector can detect the presence of wind based on a cross-correlation between at least two exterior microphone signals (produced by different exterior microphones). For example, if two of the exterior microphone signals are significantly dissimilar (e.g., satisfying a cross-correlation threshold), then the detector can deem that wind is present. Wind tends to generate noise among exterior microphones in a deviating and non-uniform manner, thus cross-correlation between microphones can give notice of wind.

Figure 2:
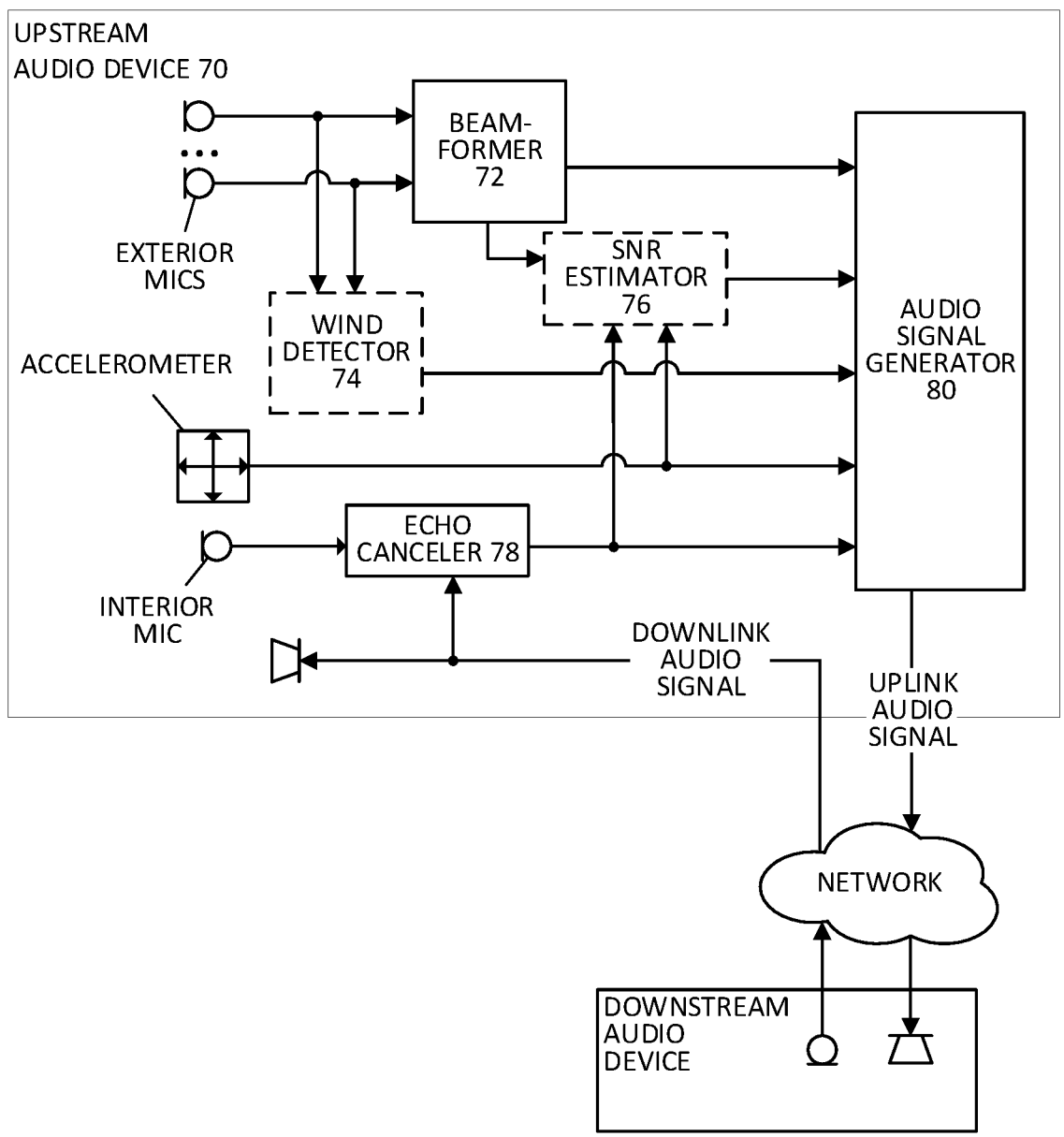
FIG. 2 shows a process and system for generating an audio system with an interior microphone, having wind detection and/or noise detection, according to one aspect.

In one aspect, a SNR estimator 76 can detect whether or not background noise is present. The SNR estimator can determine a signal to noise ratio. In telephony applications, the signal can be the user's voice activity and the noise can be sound picked up by the exterior microphones other than the user's voice activity. The SNR estimator can generate the SNR based on the raw exterior microphone signals, or from a pickup beam signal, as shown in FIG. 2. The SNR can further use the accelerometer signal and/or interior microphone signal as a reference for the speech signal, since these sensors are resistant to background noise and wind. Similarly, as already discussed, an echo canceler 78 can suppress echo in the interior microphone signal, which can provide an accurate speech reference to the SNR estimator. If the SNR is below a threshold, or if wind is detected, then the audio device can take certain measures.

In response to detecting whether wind and/or background noise is present, the audio system can adjust how the uplink audio signal is generated. For example, the audio signal can be adjusted to increase the contribution of the interior microphone and decrease the contribution of the exterior microphone to the uplink audio signal, when wind and/or noise is detected. Similarly, the uplink audio signal can be adjusted to decrease the contribution of the interior microphone and increase the contribution of the exterior microphone to the audio signal, when wind and/or noise is absent. The adjustments can be performed dynamically, for example, during a communication session. This is further discussed in other sections.

Figure 3:
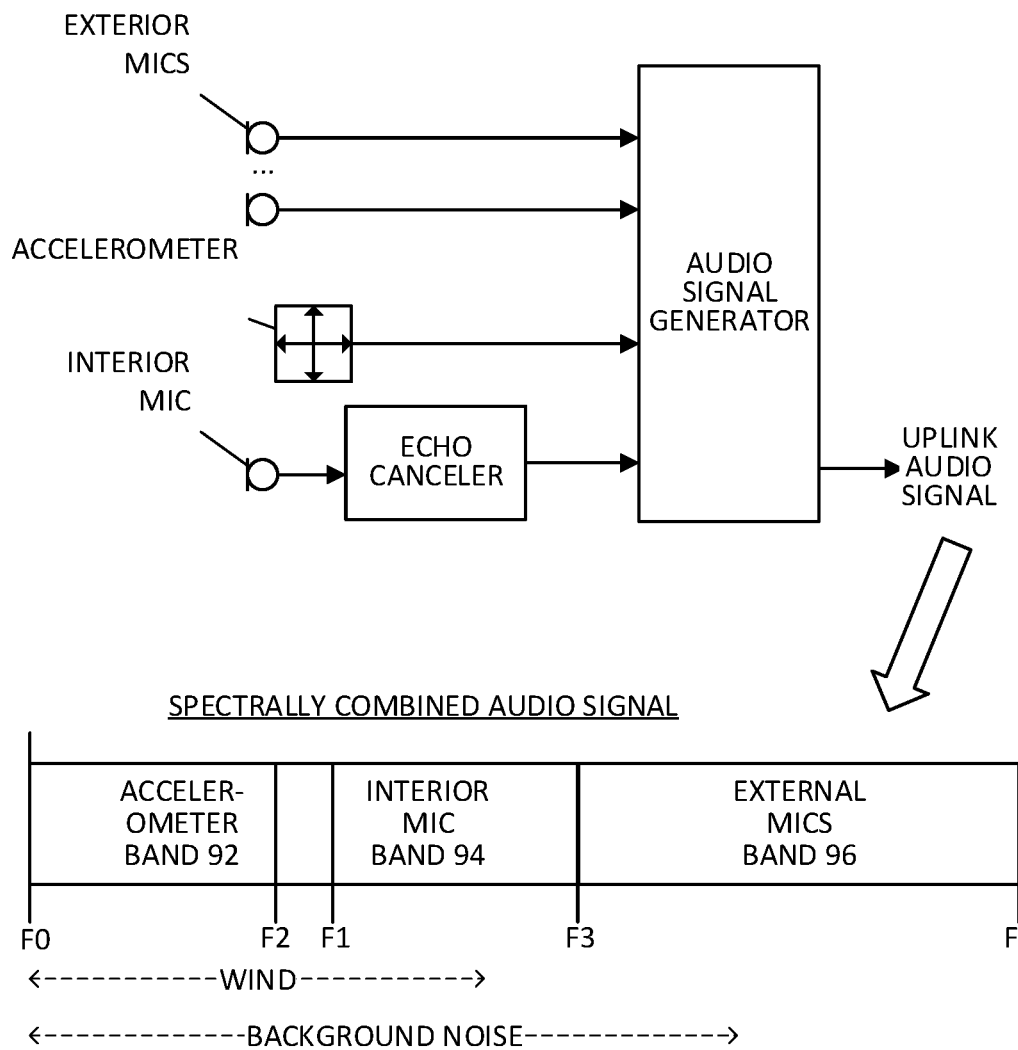
FIG. 3 shows a spectrally combined audio signal, according to one aspect.

Referring to FIG. 3, an audio signal generator can generate the uplink signal based on the exterior microphone signals, the interior microphone signal, and the accelerometer signal. As mentioned the exterior microphone signals can form a microphone array that can be beamformed to generate a pick up beam located where a user's voice activity is sufficiently strong. The audio signal generator can spectrally combine the exterior microphone signals (e.g., the beamformed pickup signal), the accelerometer signal, and the interior microphone signal (which can be echo-cancelled). In one aspect, the resulting audio signal has a) a first frequency band 92 generated based on the accelerometer signal, b) a second frequency band 94 generated from the interior microphone signal, and c) a third frequency band 96 generated based on the one or more exterior microphone signals.

The first frequency band is the lowest in frequency, the second frequency band has a higher frequency than the first frequency band, and the third frequency band has a higher frequency than the second frequency band. For example, the first frequency band can begin at frequency F0 (e.g., 100 Hz) and end at frequency F1 (e.g., 1 kHz). The second frequency band can begin at frequency F2 (e.g., 800 Hz) and end at frequency F3 (e.g., 2.5 kHz). The third frequency band can begin at frequency F3 (e.g., 2.5 kHz), and end at frequency F4 (e.g., 12 kHz). The frequency bands can overlap. For example, the first frequency band and second frequency band can overlap between F2 and F1, although not necessarily. In such a case, the frequency band between F2 and F1 can have contribution from both the accelerometer signal and the interior microphone signal. This overlap can help prevent audible artifacts.

Figure 4:
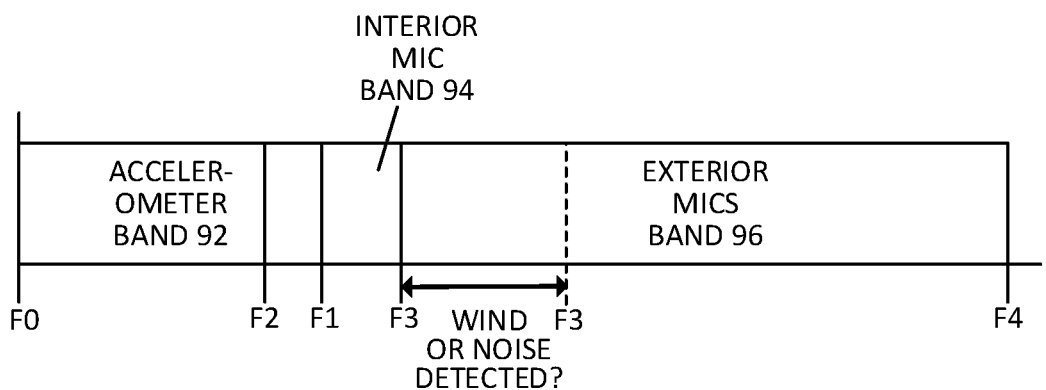
FIG. 4 shows a spectrally combined audio signal, and dynamic bandwidth modification, according to one aspect.

As described, the audio system can detect whether noise generated by wind or background noise is present in the exterior microphone signals. The detection can be done through a wind detector and/or SNR estimator, as described. Referring to FIG. 4, if noise or wind is present based on the exterior microphone signals then the audio signal generator can increase a bandwidth of a frequency band of the uplink audio signal that is generated based on the interior microphone signal (interior microphone band 94). As shown, the bandwidth can be increased by shifting the upper frequency limit (F3) of band 94 to the right. Simultaneously, the lower frequency limit (also F3) of the exterior microphone band 96 is also shifted to the right, thereby reducing the bandwidth of the lower frequency limit. Thus, when wind is detected, the uplink audio signal can have a larger contribution from the interior microphone, which is resistant to background noise and wind, while having a smaller contribution from the exterior microphones, which are more sensitive to noise and wind.

Similarly, if noise or wind is not present, then F3 can be shifted to the right, thereby decreasing a bandwidth of a frequency band of the audio signal that is generated based on the interior microphone signal (interior microphone band 94) while increasing the bandwidth of the frequency band of the audio signal that is generated based on the exterior microphone signals. In this manner, the system can utilize the wide frequency coverage and high signal to noise ratio of the exterior microphones to produce a high speech quality in the uplink audio signal during periods with low background noise and wind. The bandwidths of the interior microphone band and the exterior microphone band can be adjusted dynamically, during a communication session.

In one aspect, the audio system is a headphone that is partially or fully worn in the user's ear canal. For example, FIG. 5 shows a headphone 100 that has a portion that is inserted into a user's ear. Interior microphone 110 is located in a front cavity 108 that, that when worn by the user, is adjacent to and at least partially blocks the user's ear canal. This can create a voice occlusion effect where the interior microphone senses the user's speech from the user's ear canal.

In one aspect, the audio system is an over-ear headphone. The headphone has a speaker that is worn over the user's ear, and a seal of the audio system that blocks ambient sound from traveling to the user's ear canal from the air. The seal also creates a voice occlusion effect in a front cavity of the headphone where the interior microphone is located. The interior microphone can sense the user's speech from the user's ear canal. Regardless of whether the headphone is worn in-ear or over-ear, the headphone's accelerometer can pick up voice activity of the user.

Various aspects described herein may be embodied, at least in part, in software. That is, the techniques and blocks illustrated in the various figures (for example, FIGS. 1-3) may be carried out in an audio processing system in response to its processor executing a sequence of instructions contained in a storage medium, such as a non-transitory machine-readable storage medium (e.g. DRAM or flash memory). In various aspects, hardwired circuitry may be used in combination with software instructions to implement the techniques described herein. Thus the techniques are not limited to any specific combination of hardware circuitry and software, or to any particular source for the instructions executed by the audio processing system.

In the description, certain terminology is used to describe features of various aspects. For example, in certain situations, the terms "estimator", "combiner", "synthesizer", "controller", "beamformer", "component," "unit," "module," "logic", "extractor", "generator", "processor", "canceler", "detector", and "simulator" are representative of hardware and/or software configured to perform one or more processes or functions. For instance, examples of "hardware" include, but are not limited or restricted to an integrated circuit such as a processor (e.g., a digital signal processor, microprocessor, application specific integrated circuit, a micro-controller, etc.). Thus, different combinations of hardware and/or software can be implemented to perform the processes or functions described by the above terms, as understood by one skilled in the art. Of course, the hardware may be alternatively implemented as a finite state machine or even combinatorial logic. An example of "software" includes executable code in the form of an application, an applet, a routine or even a series of instructions. As mentioned above, the software may be stored in any type of machine-readable medium.

Some portions of the preceding detailed descriptions have been presented in terms of algorithms and symbolic representations of operations on data bits within a computer memory. These algorithmic descriptions and representations are the ways used by those skilled in the audio processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of an audio processing system, or similar electronic device, that manipulates and transforms data represented as physical (electronic) quantities within the system's registers and memories into other data similarly represented as physical quantities within the system memories or registers or other such information storage, transmission or display devices.

The processes and blocks described herein are not limited to the specific examples described and are not limited to the specific orders used as examples herein. Rather, any of the processing blocks may be re-ordered, combined or removed, performed in parallel or in serial, as necessary, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as, special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination hardware devices and software components.

While certain aspects have been described and shown in the accompanying drawings, it is to be understood that such aspects are merely illustrative of and not restrictive on the broad invention, and the invention is not limited to the specific constructions and arrangements shown and described, since various other modifications may occur to those of ordinary skill in the art. The description is thus to be regarded as illustrative instead of limiting.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A headphone, comprising:
    a plurality of exterior microphones, directly exposed to an environment of the headphone, that generates corresponding exterior microphone signals;
    an accelerometer that generates an accelerometer signal;
    an interior microphone, not directly exposed to the environment, that generates an interior microphone signal; and
    a processor, configured to
    generate an audio signal containing voice of a user, based on a) the accelerometer signal that a first frequency band of the audio signal is generated from, b) the interior microphone signal that a second frequency band of the audio signal is generated from, the second frequency band of the audio signal having a higher frequency than the first frequency band, and c) the plurality of exterior microphone signals.

2. The headphone of claim 1, wherein the audio signal has a third frequency band generated based on the exterior microphone signals, the third frequency band having a higher frequency than the second frequency band.

3. The headphone of claim 1, wherein generating the audio signal includes beamforming at least two of the exterior microphone signals to form an exterior beamformed signal used to generate the audio signal.

4. The headphone of claim 1, wherein the interior microphone is echo cancelled.

5. The headphone of claim 1, wherein the headphone is at least partially worn in an ear canal of the user.

6. The headphone of claim 1, wherein the headphone is worn over an ear of the user, and a seal of the headphone blocks ambient sound from traveling to an ear canal of the user from ambient air.

7. The headphone of claim 1, the interior microphone and a speaker are housed in a same cavity of the headphone.

8. The headphone of claim 1, wherein the processor is further configured to detect if noise or wind is present based on the exterior microphone signals, and, if noise or wind is present; increase a bandwidth of a frequency band of the audio signal that is generated based on the interior microphone signal.

9. The headphone of claim 1, wherein the processor is further configured to detect if noise or wind is present based on the exterior microphone signals, and, if noise or wind is not present; decrease a bandwidth of a frequency band of the audio signal that is generated based on the interior microphone signal.

10. The headphone of claim 9, wherein detecting if noise is present is based on a signal to noise ratio (SNR) and detecting if wind is present is based on a cross-coherence between the exterior microphone signals.

11. The headphone of claim 1, wherein the exterior microphones form a microphone array.

12. An article of manufacture, having
    a plurality of exterior microphones, directly exposed to an environment of the article of manufacture, that generates corresponding exterior microphone signals;
    an accelerometer that generates an accelerometer signal;
    an interior microphone, not directly exposed to the environment, that generates an interior microphone signal; and
    a processor, configured to
    generate an audio signal containing voice of a user, based on a) the exterior microphone signals, b) the accelerometer signal that a first frequency band of the audio signal is generated from, and c) the interior microphone signal that a second frequency band of the audio signal is generated from, the second frequency band of the audio signal having a higher frequency than the first frequency band; and
    communicate the audio signal to a downstream device, the downstream device driving a speaker with the audio signal to produce sound.

13. The article of manufacture of claim 12, wherein the audio signal has a third frequency band generated based on the exterior microphone signals, the third frequency band having a higher frequency than the second frequency band.

14. The article of manufacture of claim 13, wherein the first frequency band and the second frequency band overlap.

15. The article of manufacture of claim 13, wherein the first frequency band has a range of 100 Hz to 1 kHz, the second frequency band has a range from 800 Hz to 2.5 kHz, and the third frequency band has a range from 2.5 kHz to 12 kHz.

16. A method, comprising:
    receiving exterior microphone signals generated by a plurality of exterior microphones of a headphone directly exposed to an environment the headphone;
    receiving an accelerometer signal generated by an accelerometer of the headphone; and
    receiving an interior microphone signal generated by an interior microphone of the headphone that is not directly exposed to the environment; and
    spectrally blending a) the accelerometer signal, b) the interior microphone signal, and c) the exterior microphone signals, to form an audio signal containing vocal sounds of a user, wherein the audio signal has a first frequency band generated based on the accelerometer signal, and a second frequency band generated based on the interior microphone signal, the second frequency band having a higher frequency than the first frequency band.

17. The method of claim 16, further comprising communicating the audio signal to a downstream device wherein speakers of the downstream device are driven with the audio signal to reproduce the vocal sounds of the user.

18. The method of claim 16, further comprising
    detecting if noise or wind is present based on the exterior microphone signals; and
    if noise or wind is present; then increasing a bandwidth of a frequency band of the audio signal that is generated based on the interior microphone signal; or
    if noise or wind is not present; then decreasing the bandwidth of the frequency band.

19. The method of claim 18, wherein detecting if noise is present is based on signal to noise ratio of the exterior microphone signals.

20. The method of claim 18, wherein detecting if wind is present is based on a similarity between the exterior microphone signals.

* * * * *